Patented Nov. 8, 1949

2,487,627

UNITED STATES PATENT OFFICE 2,487,627

PROCESS FOR THE DECOMPOSITION OF STYPHNIC ACID

Roger Gordon Aitken, Mount Royal, Quebec, and Harvey Richard Lyle Streight, Hampstead, Quebec, Canada, assignors, by mesne assignments, to Canadian Industries Limited, a corporation of the Dominion of Canada No Drawing. Application January 31, 1946, Serial No. 644,662. In Canada May 19, 1945

9 Claims. (Cl. 210—2)

This invention relates to a method for the decomposition of normally solid, nitrated organic compounds. It relates especially to a process for the decomposition of styphnic acid and, more particularly, to a process for rendering harmless the effluent from the manufacture of styphnic acid or its metallic salts.

It has been observed that 1000 litres of effluent from the preparation of lead styphnate, for example, contains approximately 30 pounds of the styphnate as sediment or held in suspension while 1000 litres of effluent from the manufacture of styphnic acid contains about 3 pounds of the acid in solution.

As styphnic acid and its metallic salts are explosive materials which are extremely sensitive to shock and friction, especially when dry, it is important to ensure that the explosive-containing effluent be rendered harmless prior to disposal thereof. Dilution of the effluent with water does not remove the hazard.

An object of this invention is an improved method for the decomposition of normally solid nitrated organic compounds. A further object is an efficient and inexpensive method for the decomposition of styphnic acid or its derivatives containing the styphnic radical, basic or normal, and particularly the styphnates of barium, sodium, lead, basic lead and magnesium. A further object of this invention is a process for rendering harmless by chemical treatment effluent from the manufacture of styphnic acid or its derivatives as heretofore stated. A still further object is the controlled decomposition of the said styphnic acid and its derivatives present in small quantities in the said effluent. These and other objects of the invention will become apparent as the description proceeds.

These objects are accomplished in accordance with our invention by treatment of styphnic acid with chlorine. In our preferred method, for the treatment of effluent from the manufacture of styphnic acid, the pH of the solution is adjusted, if necessary, by addition of sulphuric acid, preferably to a pH between 1.5 and 2.75, and chlorine gas is then bubbled through the solution. In the treatment of effluent from the manufacture of water-soluble styphnates, such as for example magnesium styphnate, acidification of the solution to a pH of about 1.5 results in decomposition of the styphnate salt to styphnic acid which can then be treated as above described. In the case of water-insoluble styphnates, such as lead styphnate, however, it is first advisable to treat the effluent with an alkali or an alkaline solution such as sodium carbonate to produce the water-soluble sodium styphnate, which is then converted to styphnic acid by addition of acid and decomposed by treatment with gaseous chlorine as previously discussed.

On completion of the reaction between the styphnic acid present in the effluent and chlorine, there is a sharp change in the color of the solution from orange-red to pale lemon-yellow, which is of value in providing a visual end point for the reaction.

The absence of styphnic acid in the treated effluent can be determined by application of the "Nitron" test, in which 1,4-diphenyl-3,5-endoanilo-1,2,4-triazoline in a 10–15% acetic acid solution is added to the treated effluent solution. If styphnic acid is present, a yellow precipitate will result, but in no instance was such a precipitate obtained when the test was applied to effluent treated in accordance with our invention.

The invention is illustrated but not limited by the following examples.

Example I 1000 litres of effluent containing 34.3 lb. of lead styphnate was collected in an earthenware crock equipped with a mechanical stirrer. 16 pounds of sodium carbonate was added, followed by the addition of 62 pounds of 93% sulphuric acid. The mixture was agitated with stirring and 25.1 pounds of chlorine gas was bubbled through the solution for a period of ten hours and 20 minutes, at which point the color of the solution changed from orange-red to pale lemon-yellow. Application of the "Nitron" test showed that no styphnic acid or derivative of styphnic acid was present.

Example II 1000 litres of effluent containing 3 lb. of styphnic acid was placed in an earthenware crock. About 9 lb. of chlorine gas was bubbled through the solution, whereupon the color changed from orange-red to pale lemon-yellow, and the "Nitron" test showed that the styphnic acid was completely destroyed.

Example III 9.0 litres of effluent containing 1.5 pounds of styphnic acid and acid equivalent to 14 pounds of nitric acid and 228 pounds of sulphuric acid per 1000 litres, was placed in an earthenware crock provided with a mechanical stirrer. The solution was stirred and 5.5 grams of bleaching powder (35% available chlorine) was added during a 60 minute period. At this point there was a sharp change in color from orange-red to pale lemon-yellow, and a "Nitron" test showed that the last trace of styphnic acid was destroyed.

Example IV 1000 litres of effluent containing 3.5 pounds of styphnic acid was placed in an earthenware crock provided with a mechanical stirrer. The pH of the solution was 2.0. The mixture was agitated and 24.5 lb. of chlorine gas was bubbled through the solution for a period of seven hours and 45 minutes, at which point there was a sharp change in the color from orange-red to pale lemon-yellow.

While we have disclosed the use of gasous chlorine as the preferred agent for the decomposition of styphnic acid, any chemical containing available chlorine may likewise be used such, for example, as the alkali and alkaline earth metal hypochlorites as well as liquefied chlorine. The use of calcium hypochlorite (bleaching powder) was illustrated in Example III.

Sulphuric acid has been disclosed as the preferred acidification agent, but it is obvious that other inorganic acids may be used.

Decomposition of styphnic acid on treatment with chlorine will occur in either acid or alkaline solution, but since chloropicrin is evolved in relatively large amount in alkaline, and to a lesser extent in slightly acid solution, it is preferred to treat the acid affluent, desirably at a pH between 1.5 and 2.75. Under the preferred conditions evolution of chloropicrin is reduced to a minimum and the fumes can readily be removed from the effluent treatment room by forced ventilation.

The invention has been described in the foregoing with particular reference to styphnic acid and styphnates, as this is a case where the process has been found particularly useful, because of the sensitivity of the explosive compounds and the necessity of destroying such compounds. The invention is applicable, however, to normally solid nitrated organic compounds generally, both true nitro compounds and nitric esters, for example pentaerythritol tetranitrate, trinitrotoluene, picric acid, tetryl and the like.

The above description and examples are intended to be illustrative only.

We claim:

1. In a process for the decomposition of styphnic acid, the step which comprises contacting an aqueous solution of styphnic acid acidified to a pH between 1.5 and 2.75 with a quantity of chlorine at least sufficient to react with all of the styphnic acid in said solution.

2. A process for the decomposition of styphnic acid which comprises adding to an aqueous solution of styphnic acid having a pH value between 1.5 and 2.75, a quantity of chlorine at least sufficient to react with all of the styphnic acid in said solution.

3. A process for the decomposition of styphnic acid which comprises adding to an aqueous acid solution of styphnic acid having a pH value between 1.5 and 2.75, a quantity of gaseous chlorine at least sufficient to react with all of said styphnic acid in the solution.

4. A process for the decomposition of styphnic acid which comprises adding to an aqueous acid solution of styphnic acid having a pH value between 1.5 and 2.75 an amount of an inorganic hypochlorite at least sufficient to react with all of the styphnic acid in said solution.

5. In a process for the decomposition of styphnic acid, the step which comprises introducing into an effluent from the manufacture of styphnic acid an amount of chlorine at least sufficient to change the color of said effluent from orange-red to pale yellow, said effluent having been acidified to a pH between 1.5 and 2.75 prior to the introduction of such chlorine.

6. In a process for the decomposition of styphnic acid, the steps which comprise acidifying with a mineral acid to a pH between 1.5 and 2.75 effluent from the manufacture of styphnates from the groups comprising alkali and alkaline earth metal styphnates, and thereafter introducing into said acidified effluent a quantity of chlorine at least sufficient to change the color of said effluent from orange-red to pale yellow.

7. In a process for the decomposition of styphnic acid, the steps which comprise acidifying with sulphuric acid to a pH between 1.5 and 2.75 effluent from the manufacture of magnesium styphnate, and thereafter introducing into said acidified effluent a quantity of gaseous chlorine at least sufficient to react with all of the styphnic acid in said effluent.

8. In a process for the decomposition of styphnates, the steps which comprise alkalizing with an alkali effluent from the manufacture of lead styphnate, acidifying said alkaline effluent solution with a mineral acid to a pH between 1.5 and 2.75, and thereafter introducing into said effluent an amount of chlorine at least sufficient to react with all of the styphnic acid in said effluent.

9. In a process for the decomposition of styphnates, the steps which comprise alkalizing with an aqueous solution of sodium carbonate effluent from the manufacture of lead styphnate, acidifying said alkaline effluent with sulfuric acid to a pH between 1.5 and 2.75, and thereafter introducing into said effluent a quantity of gaseous chlorine at least sufficient to react with all of the styphnic acid in said effluent.

ROGER GORDON AITKEN.
HARVEY RICHARD LYLE STREIGHT.

REFERENCES CITED

The following references are of record in the file of this patent:

UNITED STATES PATENTS

| Number | Name | Date |
| --- | --- | --- |
| 1,956,463 | Lyon | Apr. 24, 1934 |
| 2,029,960 | Urbain | Feb. 4, 1936 |
| 2,238,210 | Brun | Apr. 15, 1941 |
| 2,246,963 | Wilkinson | June 24, 1941 |